US011381929B2

(12) United States Patent
Mezaael

(10) Patent No.: US 11,381,929 B2
(45) Date of Patent: Jul. 5, 2022

(54) ADAPTIVE GEOFENCING REACTIVE TO VEHICLE DYNAMIC OBSERVATIONS

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/097,119

(22) Filed: Nov. 13, 2020

(65) Prior Publication Data

US 2022/0159406 A1    May 19, 2022

(51) Int. Cl.
*H04W 4/021* (2018.01)
*G07C 5/00* (2006.01)

(52) U.S. Cl.
CPC ............ *H04W 4/021* (2013.01); *G07C 5/008* (2013.01)

(58) Field of Classification Search
CPC ............................... H04W 4/021; G07C 5/008
USPC ...................................................... 455/456.3
See application file for complete search history.

(56) References Cited

U.S. PATENT DOCUMENTS

| 10,410,516 | B1* | 9/2019 | Andersson | G06K 9/00825 |
|---|---|---|---|---|
| 10,486,709 | B1 | 11/2019 | Mezaael | |
| 10,616,713 | B1* | 4/2020 | Yu | H04L 67/18 |
| 2019/0048639 | A1* | 2/2019 | Lickfelt | G01S 19/51 |
| 2019/0228654 | A1* | 7/2019 | Olsen | G08G 1/0112 |
| 2019/0342739 | A1* | 11/2019 | Shah | G01C 21/3492 |
| 2019/0385460 | A1 | 12/2019 | Magzimof et al. | |
| 2020/0221250 | A1* | 7/2020 | Whelen | H04W 4/46 |
| 2021/0192867 | A1* | 6/2021 | Fang | G07C 5/0816 |

FOREIGN PATENT DOCUMENTS

WO    2020142548 A1    9/2020

* cited by examiner

*Primary Examiner* — Hirdepal Singh
(74) *Attorney, Agent, or Firm* — Michael Spenner; Brooks Kushman P.C.

(57) ABSTRACT

A system receives a vehicle data snapshot. The system compares characteristics of the vehicle data snapshot to a database of known characteristics, the known characteristics identifying one or more instances corresponding to an instance type identified in a geo-fence request, the instance types in the geo-fence request having been submitted for geo-fencing around occurrences of instances of the instance type. Responsive to identifying an existence of an instance at a location where the vehicle data snapshot was taken, based on the comparison, the system establishes a geo-fence around the identified instance and transmits the established geo-fence to one or more vehicles associated with the geo-fence request.

20 Claims, 3 Drawing Sheets

ADAPTIVE GEOFENCING REACTIVE TO VEHICLE DYNAMIC OBSERVATIONS

TECHNICAL FIELD

The illustrative embodiments generally relate to methods and apparatuses for adaptive geofencing reactive to vehicle dynamic observations.

BACKGROUND

Geofencing is the notion of creating a digital fence around an area bounded by known coordinates. Such fences are often used in conjunction with navigation systems, to determine areas of interest or areas to which a vehicle computer is to react in some manner. For example, a gas station may be bounded by a geofence representing a 0.5 mile coordinate set encompassing the gas station, and a vehicle needing gas and entering the bounded region may be informed that there is a gas station within a half mile.

While useful to bound an area of a known business in the manner described, it is often the address and pre-knowledge of the business that creates the impetus for bounding. That is, if the map data didn't include the fact that the gas station existed, there would be no way to bound the gas station based on the data.

Further, the map data often doesn't include information about newer businesses, or secondary characteristics like the fact that a gas station is an "off-brand" gas station or a mechanic isn't certified to work on a given fleet of vehicles, because the map data is typically gathered in a factual sense and generally tends to simply show the existence of a known entity.

If a fleet manager wanted to fence around objects or entities without a corresponding identifier that is traditionally present in map data (e.g., something other than a business name, type or address), the fleet manager would not necessarily be able to do this based on traditionally available map data.

SUMMARY

In a first illustrative embodiment, a system includes a processor configured to receive a vehicle data snapshot. The processor is further configured to compare characteristics of the vehicle data snapshot to a database of known characteristics, the known characteristics identifying one or more instances corresponding to an instance type identified in a geo-fence request, the instance in the geo-fence request having been submitted for geo-fencing. Also, the processor is configured to, responsive to identifying an existence of an instance at a location where the vehicle data snapshot was taken, based on the comparison, establish a geo-fence around the identified instance and transmit the established geo-fence to one or more vehicles associated with the geo-fence request.

In a second illustrative embodiment, a system includes a processor configured to receive a vehicle data snapshot including an express identification of an instance represented by a data characteristic included in the vehicle data snapshot. The processor is further configured to compare characteristics of the vehicle data snapshot to a database of known characteristics, the known characteristics identifying at least the instance expressly identified as being identified by the data characteristic of the vehicle data snapshot. Also, the processor is configured to determine one or more of the data characteristics of the vehicle data snapshot that identify the instance and modify the known characteristics included in the database that are associated with the instance, to reflect determined one or more data characteristics representing the instance in the vehicle data snapshot to improve a model for identifying the instance and based on the modified known characteristics.

In a third illustrative embodiment, a computer-implemented method includes receiving a request for establishing a geo-fence of a defined perimeter around occurrences of instances of one or more types defined by the request and within a defined geographic area defined by the request. The method also includes receiving a vehicle data snapshot. The method further includes determining that an occurrence of at least one instance of one of the one or more types exists at a location where the vehicle data snapshot was obtained, based on comparing characteristics of the vehicle data snapshot to a first dataset of known characteristics associated with a known instance of the type of the at least one instance. The method additionally includes establishing a first geo-fence around the at least one instance and transmitting the first geo-fence to one or more vehicles associated with the request.

DETAILED DESCRIPTION

Figure 1:
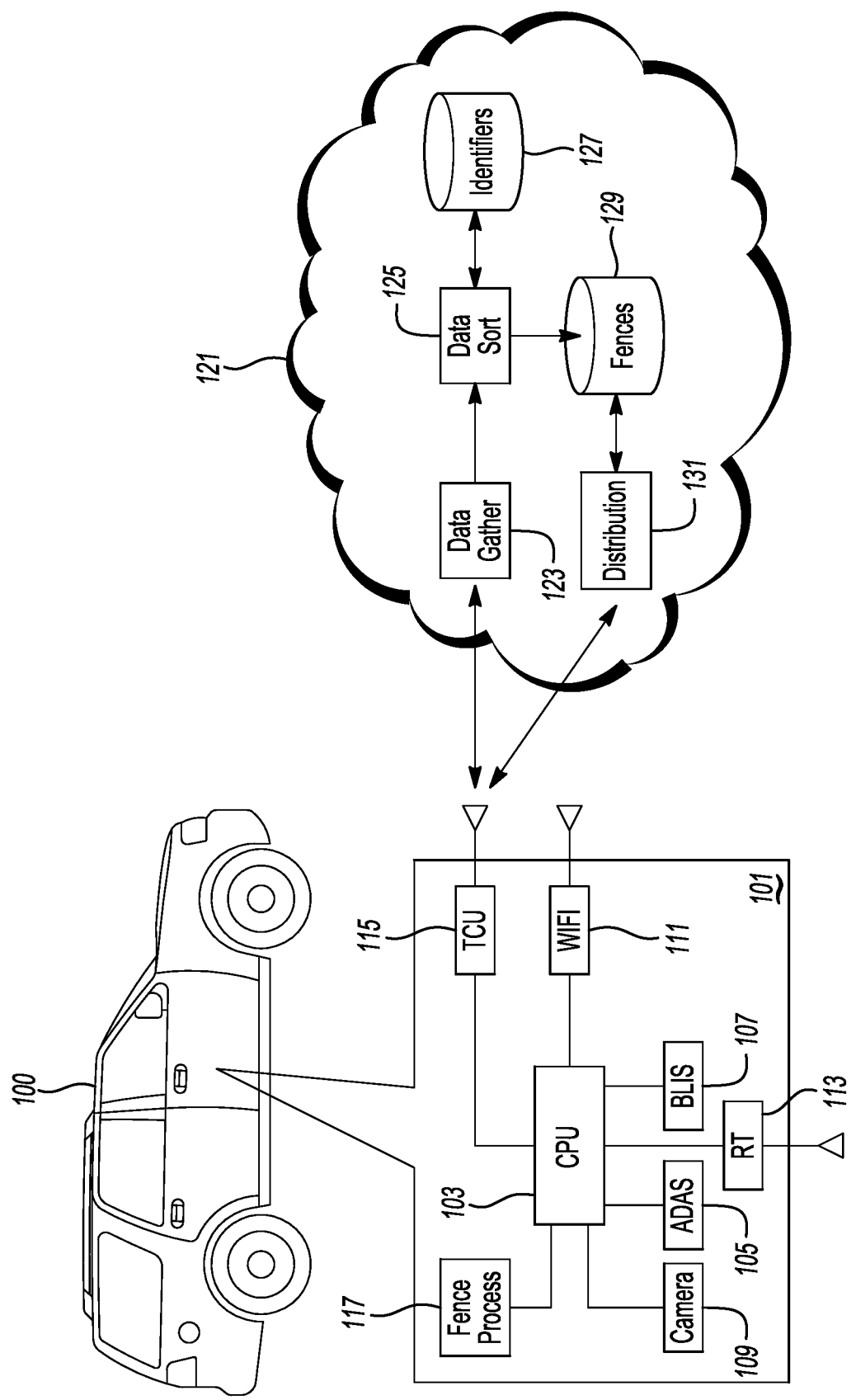
FIG. 1 shows an illustrative example of a vehicle data gathering and analysis system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Fleet managers may desired a granular level of instructional control over their fleet vehicles that may not be supported by traditional map data. From restricting usage of certain brands of fuel or businesses, to restricting parking near certain businesses, to restricting access or travel through certain areas, managers may desire to create geofences around a variety of entities and conditional occurrences that may not be supported by map data that may only include a business name, type and address.

For example, a fleet manager may not want drivers installing after-market entertainment devices in a vehicle, and so may prohibit parking within a defined distance of businesses selling after-market entertainment devices (presumably preventing parking of sufficient duration for an installation to occur). Unfortunately, while certain businesses may be named "Car Electronics Central" and provide an easy indication for exclusion, other businesses may simply carry and install such devices, but the business name would be no indicator of this (e.g., "Al's Play Store"— which may be an electronics store, but which is not apparent from the name). Unless the fleet manager has somehow cataloged all of the various businesses, and identified them for a fencing-process to include in exclusion zones, there may be plenty of businesses that could perform the undesirable service that are not apparent from map data indicators.

In another example, the fleet manager may not want a vehicle parked within 250 feet of a business that serves alcohol, and again the name of the business may be sufficient to identify the business as such (e.g., "Frank's Diner" may have a full bar service, but appear to simply be a diner based on the name).

The illustrative embodiments allow for use of vehicle sensors to capture vehicle data snapshots. Examples of the concept of data snapshots are generally described in co-owned and co-assigned U.S. Pat. No. 10,486,709, filed on Jan. 19, 2019 and granted on Nov. 26, 2019, the contents of which are hereby incorporated by reference. Generally speaking, without limitation, a vehicle data snapshot includes data and events detected by various vehicle sensors, that may include, but which are not limited to, control sensors, cameras, LIDAR, RADAR, user inputs, wireless communication systems, etc.

For example, at a given moment in time, a vehicle may capture a data snapshot indicating that a wireless network named "Judy's Bar" was present, and a vehicle camera may capture an instance of a business with a neon beer sign and the name Judy's Bar on a sign. Any or all of this data can be indicative of a bar being present, even if map data does not show such a bar or indicate that the name of the location includes the word "Bar" (e.g., the business had recently been repurposed and the data had not yet been updated). The illustrative embodiments provide an opportunity to analyze the vehicle snapshot data and, based on characteristics indicated in the data, extract occurrences of instances that may be of interest to a person looking to established dynamic geo-fencing.

An instance can include, but is not limited to, a business type, a viewable or discernable characteristic (e.g. a bike lane), or other characteristics indicated by sensed data (e.g., a broken road, which may be unsuitable for travel if carrying a fragile load or a low-clearance because of a street lamp or other obstruction that may not be present on map data). By utilizing data snapshots gathered by vehicles as they travel, a wealth of additional information can be known about localities that may not be reflected in traditional map data. This can allow for a fleet manager to define, for example, a prohibition against travel where there are 10 foot or lower clearances, against parking where there is a bar or a bike lane, and the snapshot data can be utilized to extract identified occurrences of these instances even when they are not reflected in map data. While the accessible library of instances may not be perfect initially, data gathered over time, by the fleet and/or by others, will lead to a large repository of secondary information that can allow for a variety of definable geofences.

Because the data can be updated in real-time, if a vehicle takes a data snapshot, the geofences can also be updated in real time. This allows for ongoing inclusion of new fences, as well as, if desired, tasking of a vehicle to a specific location for the express purpose of data-gathering. That is, if a fleet manager saw numerous vehicles parking at a location, or a single vehicle parking at the location at numerous times, and the map data did not indicate a prohibition against that location, the fleet manager could have a vehicle passing by the location take a data snapshot, or dispatch a vehicle to the location to take a data snapshot, to ensure that the location should not be included in a list of geofenced prohibited areas.

Through the use of the illustrative embodiments and the like, it is possible to improve the ability of a computing system to identify and designate geofences corresponding to data that may not be included in traditional map data. This can include both the dynamic identification of instances of interest from the data and the improved ability of the system to identify such instances over time, as characteristic data becomes more refined as the data repository grows.

FIG. 1 shows an illustrative example of a vehicle data gathering and analysis system. In this illustrative example, vehicle 100 is a fleet vehicle that may include a variety of onboard sensor and communication systems 101 that allow for data snapshotting and sharing. These systems may vary by vehicle 100, but may be included in all types of vehicles, not simply fleet vehicles. If a vehicle owner grants permission, for example, all gathered data from that vehicle may be sharable with a variety of interested parties. The data could have any identifying information scrubbed therefrom, and in this manner a vast number of vehicles 100 can work in conjunction to gather and share data via vehicle data snapshots. Even if a vehicle 100 lacks certain sensors provided to another vehicle, any data gathered by that vehicle 100 may be useful in the aggregate to form a more complete set of information relating to areas in which that vehicle 100 has traveled.

In this example, the vehicle 100 includes a processor 103, that communicates with a variety of onboard sensors, systems, processes and communication connections. These include, for example, an adaptive driving assist system (ADAS) 105. ADAS can include a wide variety of systems such as, but not limited to, adaptive cruise control, anti-lock braking, heads-up displays, night vision, collision alert and avoidance, drowsiness detection, stability controls, lane centering and departure warning, rain sensors, traction control, etc. While not all of these systems include data recording or are designed to explicitly record data, some may include data recording and with others, the fact that a system was engaged (e.g., lane departure, traction control, etc.) can be indicative of an occurrence of a reason to engage the system, which can add to the inferable information about a location at which a data snapshot was taken.

Blind spot information systems (BLIS) 107 often include cameras and sensors that can sense sideward and rearward traffic, as well as low-lying front obstructions in some newer vehicles. This information can also be used in data-gathering, as these cameras and sensors can record and share data even if the system itself is not triggered for the purpose of an alert for a current driver. Other vehicle 100 cameras 109 can also be used to capture data, and these can include LIDAR systems and other camera based data gathering systems that may have an alternative primary purpose, but which may be utilized in a data snapshot to gather instantaneous information.

The system 101 may also include, for example, Wi-Fi communications 111, BLUETOOTH communications 113, and one or more telematics control units (TCU) 115. These communications systems can serve to share data about vehicle data snapshots, as well as be used to gather data in certain instances. For example, a Wi-Fi transceiver 111 onboard the vehicle 100 may be used to detect the presence of networks, which can be useful for determining the existence of a certain business based on a network name. In other examples, the fleet manager may want to fence around free Wi-Fi networks in general, to avoid employees sitting in a vehicle watching streaming video, and so the mere existence of an open network can be sufficiently useful information to establish a fence that encompasses the range of the network. The boundaries of the network can be established over time via multiple data snapshots, but may initially be assumed based on where an initial signal was detected (e.g., two radians worth of projected signal range, using the detection point as an initial center).

In addition to sensor capability, the system may include a geofence process 117. This can be an active analysis process, a process that adds identified geofences to the map data (obtained from the cloud, for example), a process that includes data snapshotting instructions (e.g., from a fleet manager), or any combination of these and other reasonable supplemental processes related to the illustrative embodiments. The various processes may be provided as independent processes as well, and one or more may also be supported by the cloud and/or by a computing device (e.g., a mobile phone) wirelessly connected to the vehicle 100 via, for example, the BLUETOOTH connection 113.

As the vehicle 100 gathers data snapshots, it can transmit the information to the cloud 121, which may include various post-processing and analysis software, as well as data repositories. In this example, a data gatherer process 123 in the cloud 121 serves to receive the data from the vehicles 100 that gather data snapshots as they travel. This data may be passed to a data sorting process 125, which can isolate data elements and characteristics for categorizing a data snapshot, to render the snapshot useful in later determining whether it applies to a geofenced area. Data sorting may also include analysis, which can use existing known characteristics (e.g., elements that look like X tend to indicate the occurrence of Y type of instance) of other data to attempt to confirm what instances are present based on a current data snapshot.

So, for example, if a current data snapshot including image data shows a vertical bar-like structure extending a certain distance, that may be characteristic of a lamp-arm as may be known from other data snapshots that have been verified. The current data snapshot could be used to estimate the height of the lamp arm based on the location of the arm relative to a known location in the vehicle of the camera, and this could serve as a guess at the presence of an obstruction at, for example, 10 feet above the road. Or, if the lamp arm visually matched other lamp arms in similar proximity (from other local snapshots), and the installation of all lamps was standard or projected to be standard, the known characteristics of the other lamp arms (e.g., 2 feet out from curb, 10.7 feet off the road surface) could be applied to the current data snapshot.

Then, for example, a fleet manager specified that a truck should not be within 2 feet of the curb in any areas with lamp arms lower than 11 feet off the surface, this area may be included in a list of areas that the truck should either avoid or in which the truck should stay more than 2 feet from the curb. Since the lamps are fairly small objects, they could be geofenced fairly discretely without creating a large geofence around a whole area. On the other hand, if the lamps regularly occur at 20 foot intervals, detection and identification of sufficient lamps may cause the process to designate a whole area of lamps as "caution". Since the driver may have to make deliveries in this area, known lamp locations may be useful (as the driver can park between them), but it may also be useful to have a known area where such lamps occur designated as "caution." This is just one example of how vehicle data snapshots may be used to dynamically identify and mark areas with discrete, adaptive geofences that can be responsive to data that is not traditional digital map data.

The cloud in this example includes two databases, an identifiers database 127 and a fence database 129. The identifiers database 127 may store a vast number of already-captured snapshots that can be used to build a specific geofence library for a request. This can be accomplished by running the parameters specified by a fleet manager over a range of snapshots already logged for a defined area. Some instances in a given snapshot may already be known and logged (e.g., the lamps), but the fleet manager may also want to avoid parking within 50 feet of a mailbox, and so the snapshots in the region might have to be considered for what was or was not a mailbox. If insufficient data existed for confirmed instances of mailboxes, the system could guess at what was a mailbox based on general known characteristics of mailboxes, and once a few instances were verified, the system could confirm all other instances of mailboxes based on verified characteristics.

Since data on what is or is not a mailbox can be pulled from a variety of data, even outside the area of interest, the system may potentially have mailboxes identified in another data set, and use those characteristics to identify mailboxes in the data set of interest, at least initially. Mailboxes tend to be fairly uniform in composition, but similar logic can be used to identify other instances (e.g., things that look like neon signs often designate the existence of a bar, things that look like commercial garage bays in sequence often designate mechanic shops or firehouses, etc.).

The fences database 129 may store the fence data for a variety of fences of interest for a given fleet or customer, and may also allow for fence-sharing (e.g., when a new request matches a previous request from another person), which can also make the analysis faster, since all the previously designated fences meeting that characteristic may have already been established for another interested party. The request may partially match based on a designated outer boundary (e.g., a fleet delivery or service radius) but the matching data can be used to store matching fences, and the data can also be used to characiscally identify instances in the unmatched areas, which likely also contain, or will contain after some time, data snapshots.

Matching of characteristics may also be a weighted occurrence, where some objects have a generally known dimension (e.g., a standard mailbox or fire hydrant), and other objects may vary with locality (e.g., street light heights, bridge heights, etc). Characteristics may be tested or matched on a geographic proximity basis. For example, all streetlights in a given city, town or section of geography may be initially assumed to have the same general characteristics, and even if there is a more common streetlight composition for a national average, for example, the process may use the local data first, assuming it to be a better match. In a region with no prior streetlight data, in this example, the national average might be used, until data is established that represents more likely characteristics of such instances.

Fence data can be distributed to all fleet vehicles by a distribution process 131, at the request of a fleet manager or on an ongoing basis. Since fences may adapt and be newly identified over time, and warnings associated with fences may become more precise, as the data resolves as more data is gathered, the distribution process may distribute a fence update whenever a new fence is created, an existing fence is modified, a fleet manager adjusts a fence parameter, etc. Data can also be distributed to non-fleet vehicles, such as a parent who wants to fence off bars for a child, dangerous or uneven terrain for an elderly relative, etc. Even instances of things like ramps for disabled people may be identified, so a person with a need for a wheelchair access can use the data to establish positive (as opposed to prohibitive) fences around buildings and businesses with ramp access.

Figure 2:
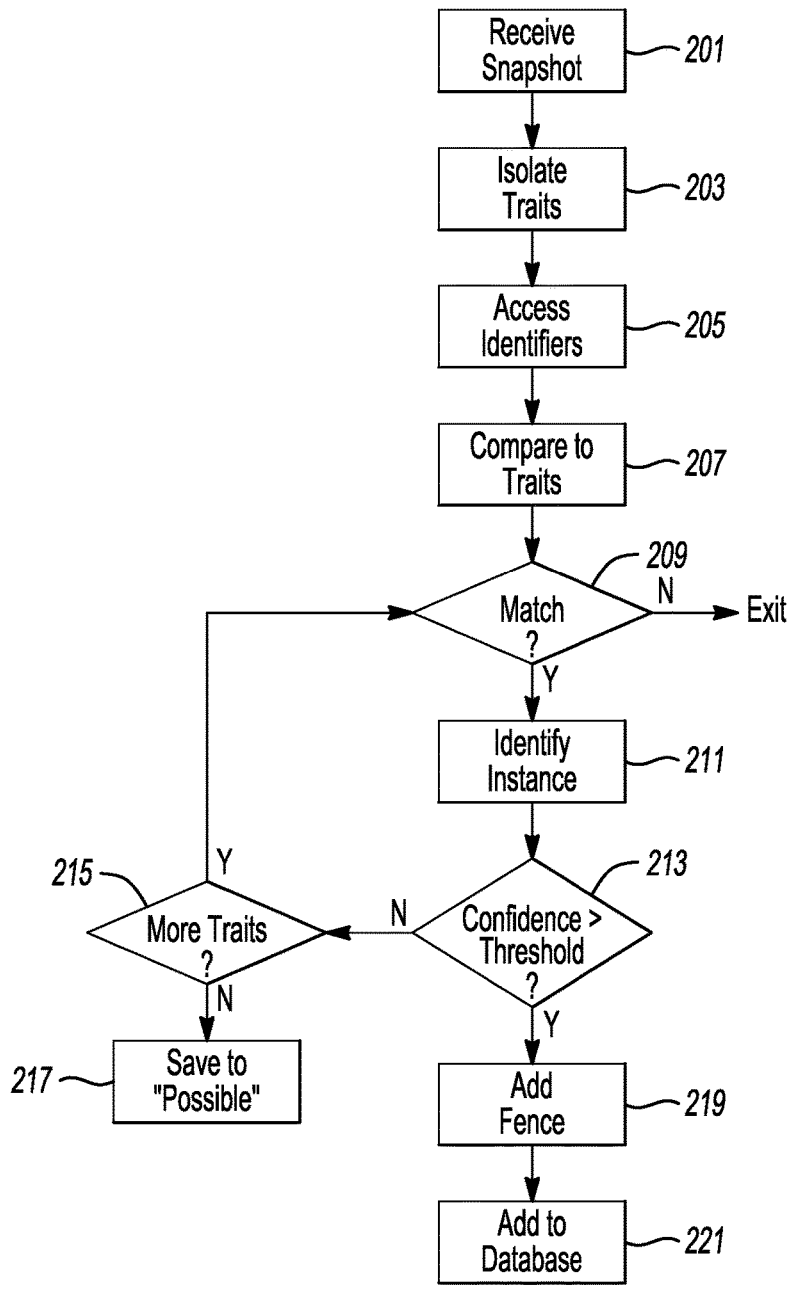
FIG. 2 shows an illustrative process for data snapshot analysis and geofencing.

FIG. 2 shows an illustrative process for data snapshot analysis and geofencing. In this illustrative example, an analysis process 125 receives a data snapshot at 201. This process 125 may execute on the cloud 121, the vehicle 100, or in a mobile device connected to the vehicle 100, for example. Onboard and mobile device processes may be limited versions of the process that utilize a localized data set or temporary data set, which simply, for example, looks for occurrences of the instances that are relevant to a given driver or fleet vehicle 100. Of course, they could be full scale processes as well, however that may require more data transfer as such processes may have to access the full characteristics database 127.

The process then extracts or isolates traits in the data snapshot at 203. This can include, for example, identifying visual objects in an image that could be something of interest to the analysis process, identifying lane-changing data, speeding or braking data, detected obstructions, ADAS engagement, etc. As previously noted, some data is explicitly indicative of an instance and other data tends to imply an instance. All relevant data may be extracted by the process 125, or a subset of data relevant to a given set of geofence considerations may be extracted (e.g., if the only fence consideration is not to park within X feet of a fire hydrant, the process 125 may only extract data indicative of a possible fire hydrant, leaving further analysis for a later request using the snapshot).

Next, the process 125 accesses an identifier or characteristic database 127 at 205. As noted, this can be one or more databases that store characteristics of a data snapshot that may be indicative of an instance of something. This data can result from sufficient inferences or explicit identification of an instance in a snapshot, such as when a driver or vehicle 100 intentionally takes a snapshot for the purpose of expressly identifying something. In the latter instances, the data may be conveyed to the process with an explicit identifier either expressly identifying what in the snapshot correlates to the instance, or at least identifying that something in the snapshot correlates to the instance. For example, it may not be possible for a driver to identify the presence of a ramp in a snapshot, but the driver can take express snapshots and identify them as definitively including ramps. The backend process 125 can then use one or more of these data sets that it has been told include ramps, to identify what is likely the ramp and build a characteristic model for ramps that can be applied to other snapshots. In other instances, common features over a variety of snapshots, some of which may include confirmed instances of something, can be used to build a model of what in a data snapshot likely indicates that something.

Whether analyzing the entire snapshot or a subset of the snapshot, the process 125 may then compare at 207 the various characteristics obtained from the database 207 to identifiers, characteristics or traits extracted from the snapshot. This can include a subset of characteristics of interest, or a full comparison, although if the characteristic database is large, doing a full comparison of all characteristics to every image may be an intensive process, and for the sake of expediency the process 125 may only compare characteristics of interest. On the other hand, a full comparison could allow for the snapshot to be catalogued with metadata indicative of all the known instances represented by the snapshot, which can help in future modeling as well as make later fencing requests process faster. In still another example, the process may identify some classifications (e.g., something in the data indicates a possible obstruction), and then use the characteristics associated with various obstructions for comparison, to limit the total number of retrievals and comparisons. The process could even get more granular, by classifying street-level and low hanging obstructions differently, and then based on where the data indicates the occurrence of an obstruction, the comparison could use an even more limited data set.

If there is a match for a characteristic at 209, the process 125 may then log an occurrence of a possible instance indicated by the characteristic(s) that match at 211. This can, in this example, include an initial possible match, which will later be confirmed by a confidence score. Whether or not to include possible matches and/or use confidence scoring can be a matter of design choice. In this illustrative implementation, if the confidence is above a threshold at 213, the process 125 adds a fence around the object at 219. The fence can be of a size relative to the object at a minimum, and can be expanded in size to encompass a requestor-parameter (e.g. a fleet manager-specified minimum distance). Fences may vary based on user parameters, and a minimum fence may be established as evidence of the presence of the object and any impactful footprint (e.g., while a lamp may have a ground-level footprint of 1×1 feet, the arm of the lamp may extend 8 feet outwards and so the fence may encompass this as well, plus a tolerance if desired to accommodate any precision-in-placement errors). Once any confirmed instances have been identified and fenced, these fences can be added to the database 129 at 221.

The database 221 may store a minimum fence and a preferred fence around each object, with the minimum fences being accessible by anyone looking for a fence around that instance, and then the fences can be adjusted for a given user's preferences. The preferred fence may correlate to a specific classification of fences for a given user. Of course, the preferred fences may be shareable as well, if a user or system manager so desires.

If the is an insufficient confidence score at 213, the process 125 may contemplate if there are any secondary traits at 215 that may tend to increase the confidence score. For example, if something looks like a tree in the middle of an intersection, the presence of joining roads may tend to indicate that it is likely not a tree (except in a roundabout scenario, for example). On the other hand, the presence of a dirt road in the data (indicated by imaging, traction data, suspension data, etc.) may tend to reinforce the conclusion that this is a tree. This data may not have been contemplated initially because the process 125 was only looking for trees, but as secondary data it may change the likelihood of the occurrence. If there are more traits that can be used to identify the instance, the process 125 may use the trait data for secondary traits to determine if the match is confirmed at 209.

Otherwise, in this example, the process 125 stores a possible match at 217. Possible matches are usable for fencing if a requestor specifies inclusion of possible matches (e.g., a highly risk-adverse user who can't take a chance that the possible match is not an actual match, such as a clearance for a truck that simply cannot pass if the clearance is below 10 feet). Possible matches may also be reconsidered as a full data set develops, so that the presence or lack of the instance may become more apparent with additional data.

Figure 3:
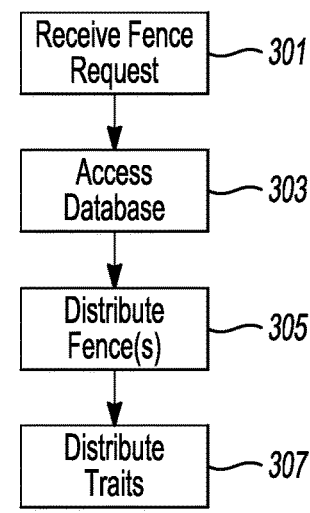
FIG. 3 shows an illustrative geofence updating and distribution process.

FIG. 3 shows an illustrative geofence updating and distribution process. In this example, a fleet manager or other user requests a fence, fence addition, fence update, etc., and the process 131 receives the request at 301. In this example, the request is a new request that may include identification of some characteristics, but may not be supported by current data gathering (e.g., from vehicles in the given fleet). Accordingly, in this example, the process accesses the fence database at 303 in order to determine what observed existing instances may correlate to the requested fences.

The process 131 may then distribute these fences to designated fleet or requestor vehicles at 305. The process 131 may also call the analysis process 125, which may analyze some or all existing snapshot data to determine if there is other data indicative of this instance. For example, if the data snapshots are not fully analyzed when they arrive, the process 125 may select a number of data snapshots that already exist, which cover a designated area, but which may not have been analyzed with respect to the requested instance.

The process 125 can then use the existing fences and the data indicative of the instance in those fences to identify similar instances in the newly examined data. In situations where the requested instance has not yet been contemplated (e.g., the request is for avoidance of blue-painted buildings), the process 125 can attempt to extract any instances from existing data, if parameters can be guessed, or the process may require one or more verified snapshots of the instance before it can attempt to model the instance from existing data.

Because additional data gathering may be useful in such examples, and because the fleet manager may only care about an area of delivery/service, where other data may not have been gathered in sufficient quantity, the process 131 can also push a parameter set and/or snapshotting instructions to a vehicle 100 at 307. This can include, for example, requests to take explicit snapshots of occurrences of the instance, as well as instructions for snapshotting in general when traveling around the area, in order to more completely establish the relevant data set. The data can include trait data, which can be a trigger for a vehicle 100 to create a snapshot and/or can be used by vehicle 100 to dynamically assess snapshots for new occurrences of the instance.

Figure 4:
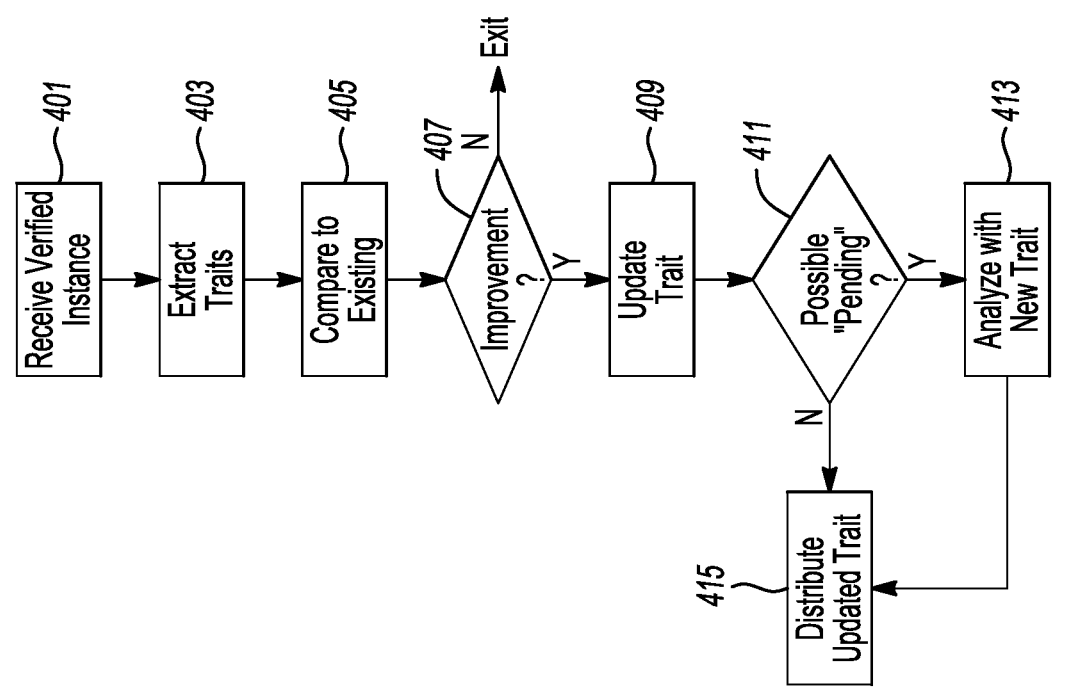
FIG. 4 shows an illustrative analysis-data update process.

FIG. 4 shows an illustrative analysis-data update process. This is an example of a process, such as the distribution process 131, that can update existing geofences and/or trait data as new information makes instance-identification more accurate or easier. In this example, the process 125 receives a verified snapshot at 401, which is a snapshot including a specified instance, which may or may not also include explicit identification of what constitutes the instance in the snapshot. For example, in a truck with fragile loads, the instance might be "unsuitable road surface" and the vehicle 100 may take a snapshot every time suspension data indicates too much jostling of the vehicle 100. These would each be verified in that the known problem had occurred at that instance, and the variable experienced by the suspension could be used to model a range of what constitutes an unsuitable road surface, for comparison against other data.

In another example, the driver may explicitly request snapshotting and designate a reason why the snapshot was taken, which can include visually identifiable instances that may be identified by the driver via an in-vehicle display (e.g., the driver selects what, in the image, constitutes the instance) or may include other instances that are simply indicated by the data and the process 125 will have to determine which data elements constitute the instance, since the process 125 has been informed that something in the data constitutes the instance. Establishment of which elements may be accomplished by, among other things, comparing a number of verified instances of something to establish commonly occurring data elements within the compared snapshots.

The process 125 extracts the traits and characteristics at 403 and, in cases where there is already some form of a model for the instance, compares those traits to existing traits that define the instance at 405. This lets the system determine if the new trait or characteristic is within an expected parameter range already defined for that instance, or whether there is an improvement to the model resulting from the verified data at 407. Even if a trait is within a parameter range, the trait may be a tipping point for the model to narrow a range, as it may have been guessing at an outer bound which may be pulled inwards if sufficient centric data exists.

If there is an improvement to the model at 407, then any number of vehicles 100 currently using fences correlated to that instance may benefit from this improvement, and the process 125 updates the model at 409 so that future requests may benefit from the updated model. At this time, the process 125 may also consider at 413 any pending possible occurrences at 411 of the instance, to determine if the new model pushes the confidence of that occurrence over the threshold for a given pending possible snapshot. The process 125 may also revisit all previously identified fences correlated to the instance, to determine if any false positives may exist. In a case of an apparent false positive, the process 125 may reallocate that fence as a possible fence, so that over-cautious fence-requestors are not denied the fence in the instance where the process 125 has made a new error and was previously correct about the instance.

Also, in this example, the process 131 distributes the updated trait model to any vehicles that are relevant at 415, which can include any vehicles to which the instance has been applied for fencing purposes, so that those vehicles 100 can reassess their own data gathering and any onboard conclusions that instances were present.

It is also possible that, to expedite data gathering, a new fence request for an area that is not heavily snapshotted can result in a multitude of snapshotting requests being sent to all or many vehicles traveling within that region, so that the data set of snapshots can be built very quickly. A fleet manager may even pay a marginal amount for the data usage incurred, to leverage the ability to build a fast and more accurate data set. In this case, the traits may be distributed to all relevant vehicles so that those vehicles can all take on-demand snapshots when a trait (under the new model, previously under the prior model) occurs that might be indicative of the instance of interest.

Figure 5:
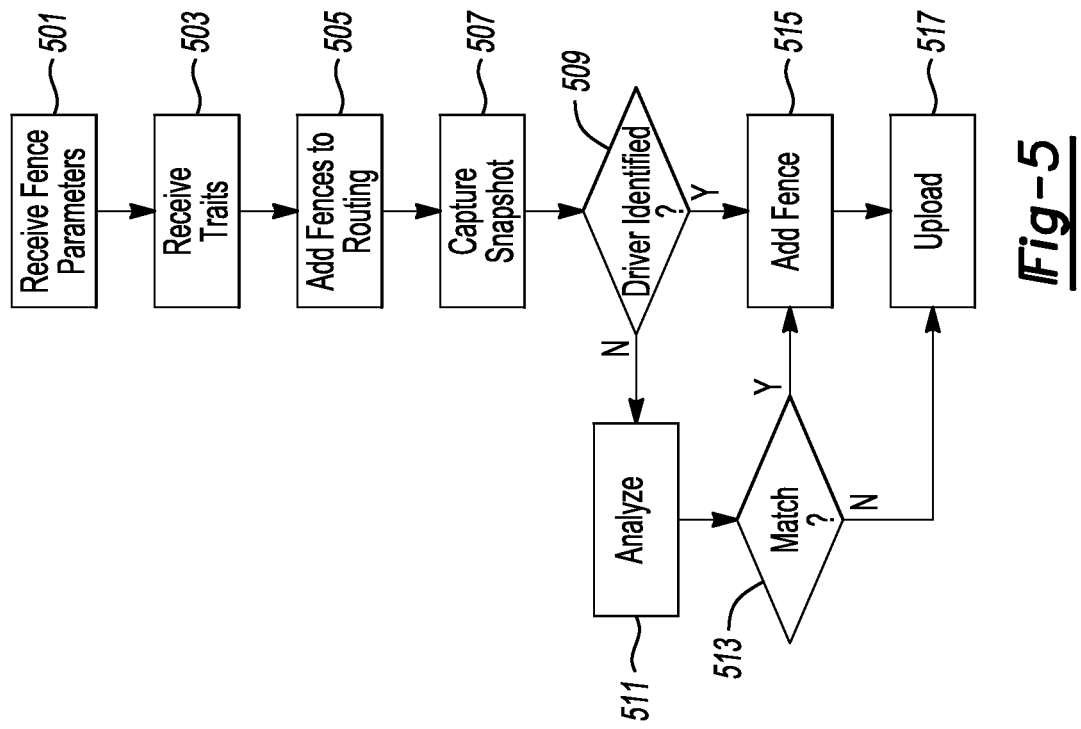
FIG. 5 shows an illustrative fence updating process.

FIG. 5 shows an illustrative fence updating process. In this example, the process 117 executing in a vehicle 100 may receive a set of fence parameters at 501, defining which instances are to be avoided by the vehicle 100 or which instances correspond to positive fences relevant to the vehicle 100, as well as actual fences defined around known or projected instances of interest. The process 117 may further receive traits that correspond to each instance type at 503, which can include identifying traits usable as the basis for snapshotting when such a trait is observed by a sensor, constraining traits defining when an identifying trait may be relevant (e.g., do not look for banks in the middle of a desert), and/or traits usable to identify a new instance from a given snapshot, whether randomly or intentionally taken by the vehicle 100.

The process 117 may add the fences to a navigation process at 505, which can contemplate the coordinate boundaries of fences and display them on any generated navigation instructions or as navigation alerts if the vehicle 100 nears or crosses a fence boundary. The navigation process may also be configured to route around certain negative fences and to include positive fences in routing or destination considerations, and which action should be taken with respect to which fence can also be defined generally for the navigation system or may be included with data for each fence.

That is, fences may be classified as "qualified destinations" or "areas of avoidance," for example, and the navigation process may be programmed to only arrive at a qualified destination (or only choose such a destination when a destination of the type for which qualification is required is chosen) or to always route around areas of avoidance when possible. In other examples, the fence data itself may specify the navigation action to be taken with regards to that fence, so that a navigation system which is not preprogrammed to address fences of varied types can still handle the fences.

Further, the process 117 can capture data snapshots at 507 as the vehicle 100 travels, which can be at random or predefined intervals, upon the occurrence or possible occurrence of a trait, or upon a driver or vehicle request. If the snapshot was expressly requested at 509, which can be a vehicle request or a driver requested snapshot, because of a known or identified instance or trait, the process 117 may add an immediate fence around the area at 515 and upload the fence at 517. The fence may then be shared with other drivers or fleet members, which may or may not include a further verification step in the cloud 121. Whether there is additional verification may depend on, for example, what level of trust a system has with a vehicle/driver, how much onboard verification occurred, whether the snapshot was responsive to a human request based on an instance or a vehicle request based on a trait, etc.

If there was not an explicit request, and/or in instances where further onboard verification is desired, the process 117 may use existing trait data to analyze the snapshot at 511. This can occur for snapshots triggered by traits, snapshots taken at intervals and even for driver requested snapshots if the system has a low confidence in the driver as a source of data, for example. If there is a trait match at 513, the process 117 may add the fence at 515, otherwise the process 117 may upload the data at 517 and may suggest a possible match, or may have no match to suggest at all.

The illustrative embodiments and the like can improve the quality of map data and the ability to dynamically fence around instances that may not be traditionally identifiable by map data, as well as provide enhanced usage for vehicle data snapshotting and various examples of how decisions about when and what to snapshot as data may be improved.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a processor configured to:
   receive a vehicle data snapshot;
   compare characteristics of the vehicle data snapshot to a database of known characteristics, the known characteristics identifying one or more instances corresponding to an instance type identified in a geo-fence request, the instance types in the geo-fence request having been submitted for geo-fencing around occurrences of instances of the instance type;
   responsive to identifying an existence of an instance at a location where the vehicle data snapshot was taken, based on the comparison, establish a geo-fence around the identified instance; and
   transmit the established geo-fence to one or more vehicles associated with the geo-fence request.

2. The system of claim 1, wherein the instance type includes a type of establishment.

3. The system of claim 1, wherein the instance type includes a vehicle impediment.

4. The system of claim 1, wherein the characteristics include visual characteristics captured by a vehicle camera.

5. The system of claim 1, wherein the characteristics include one or more wireless networks identified by a vehicle wireless transceiver.

6. The system of claim 1, wherein the request specifies the size of the geo-fence for the instance type.

7. The system of claim 1, wherein the request specifies a plurality of instance types and wherein the request specifies a different geo-fence size for at least two of the instance types.

8. The system of claim 1, wherein the request is received from a fleet manager and wherein the vehicles associated with the request are vehicles identified as belonging to a fleet with which the fleet manager is associated.

9. A system comprising:
   a processor configured to:
   receive a vehicle data snapshot including an express identification of an instance represented by a data characteristic included in the vehicle data snapshot;
   compare characteristics of the vehicle data snapshot to a database of known characteristics, the known characteristics identifying at least the instance expressly identified as being identified by the data characteristic of the vehicle data snapshot;
   determine one or more of the data characteristics of the vehicle data snapshot that identify the instance; and
   modify the known characteristics included in the database that are associated with the instance, to reflect determined one or more data characteristics representing the instance in the vehicle data snapshot to improve a model for identifying the instance and based on the modified known characteristics.

10. The system of claim 9, wherein the characteristic representing the instance is expressly identified in the vehicle data snapshot.

11. The system of claim 9, wherein the determination of the one or more characteristics is based at least in part by comparing the known characteristics identifying the instance and determining corresponding data characteristics included in the vehicle data snapshot.

12. The system of claim 9, wherein the processor is further configured to:
   receive a geo-fencing request requesting geo-fences to be established around occurrences of the instance within a defined geographic area;
   establish a geo-fence around a location where the vehicle data snapshot was taken, as indicated by the vehicle data snapshot, as the geo-fence around the instance; and
   transmit the geo-fence to one or more vehicles associated with the request.

13. The system of claim 12, wherein the processor is further configured to: analyze one or more previously identified occurrences of the instance within the defined geographic area, the one or more identified occurrences having confidence scores below a predefined threshold, the identification occurring using the modified known characteristics based on the received data snapshot.

14. The system of claim 13, wherein the processor is configured to:
   determine at least one of the previously identified occurrences of the instance which have a confidence score above the predefined threshold in light of the analysis based on the modified known characteristics;
   establish a geo-fence around a location associated with the at least one previously identified occurrence; and
   transmit the geo-fence to the one or more vehicles.

15. A computer-implemented method comprising:
   receiving a request for establishing a geo-fence of a defined perimeter around occurrences of instances of one or more types defined by the request and within a defined geographic area defined by the request;
   receiving a vehicle data snapshot;
   determining that an occurrence of at least one instance of one of the one or more types exists at a location where the vehicle data snapshot was obtained, based on comparing characteristics of the vehicle data snapshot to a first dataset of known characteristics associated with a known instance of the type of the at least one instance;
   establishing a first geo-fence around the at least one instance; and
   transmitting the first geo-fence to one or more vehicles associated with the request.

16. The method of claim 15, further comprising:
   accessing a second database of known occurrences of one or more instances of the one or more instance types;
   determining which instances, in the second dataset, of the one or more instance types, are within the geographic area;
   establishing second geo-fences around any determined instances from the second dataset; and
   transmitting the second geo-fences to the vehicles.

17. The method of claim 15, further comprising:
   modifying the known data characteristics, associated with the known instance of the type of the at least one instance, based on corresponding data characteristic included in the vehicle data snapshot, to improve a model for identifying the instance based on the modified known characteristics.

18. The method of claim 17, further comprising:
   analyzing one or more previously identified occurrences of the instance of the type of the at least one instance, within the geographic area, the one or more identified occurrences having confidence scores below a predefined threshold, the identification occurring using the modified known characteristics based on the received data snapshot.

19. The method of claim 18, further comprising:
determining at least one of the previously identified occurrences of the instance of the type of the at least one instance which have a confidence score above the predefined threshold in light of the analysis based on the modified known characteristics;
establish a geo-fence around a location associated with the at least one previously identified occurrence; and
transmit the geo-fence to the one or more vehicles.

20. The method of claim 17, further comprising:
analyzing one or more previously received vehicle data snapshots, received from the one or more vehicles, obtained within the geographic area, using the modified known characteristics to determine if any occurrences of instances of the one or more instance types exist at locations associated with the respective one or more previously received vehicle data snapshots.

* * * * *